United States Patent [19]

Nakao et al.

[11] Patent Number: 4,861,471

[45] Date of Patent: Aug. 29, 1989

[54] ACTIVATED SLUDGE TREATMENT APPARATUS

[75] Inventors: Shinichi Nakao; Shunji Yasuda; Shigehito Ikeda, all of Nagareyama, Japan

[73] Assignee: Toshiba Ceramics Co., Ltd., Tokyo, Japan

[21] Appl. No.: 28,418

[22] Filed: Mar. 20, 1987

[51] Int. Cl.[4] .............................................. B01D 36/04
[52] U.S. Cl. .................... 210/182; 210/195.3; 210/258; 210/295; 210/510.1
[58] Field of Search ................... 210/623–628, 210/510.1, 181, 187, 194, 195.3, 202, 257.1, 258, 256, 259, 295, 182, 195.2, 257.2, 321.87, 500.26

[56] References Cited

U.S. PATENT DOCUMENTS

| | | | |
|---|---|---|---|
| 3,405,058 | 10/1968 | Miller | 210/510.1 X |
| 3,472,765 | 10/1969 | Budd et al. | 210/626 X |
| 3,490,590 | 1/1970 | Davies | 210/624 X |
| 3,923,654 | 12/1975 | O'Hearn et al. | 210/510.1 X |
| 3,950,249 | 4/1976 | Eger et al. | 210/321.87 X |
| 4,072,616 | 2/1978 | Röhlig | 210/510.1 X |
| 4,160,723 | 7/1979 | Kovacs | 210/195.2 X |
| 4,196,027 | 4/1980 | Walker et al. | 210/510.1 X |
| 4,278,544 | 7/1981 | Takashima | 210/510.1 X |
| 4,617,123 | 10/1986 | Christ | 210/627 X |

*Primary Examiner*—Tom Wyse
*Attorney, Agent, or Firm*—Wegner & Bretschneider

[57] ABSTRACT

An activated sludge treatment apparatus in which waste water is introduced into a sludge tank and an activated sludge treatment is performed in said sludge tank, the improvement characterized in that a ceramic filter is provided in a passage through which waste water as effluent from said sludge tank is to be passed, and the waste water is allowed to pass through the interior of said ceramic filter and thereby separated into activated sludge and treatment water.

3 Claims, 11 Drawing Sheets

ACTIVATED SLUDGE TREATMENT APPARATUS

BACKGROUND OF THE INVENTION

The present invention relates to an improvement in an activated sludge treatment apparatus and particularly to the separation of activated sludge and treated water from each other.

Some related activated sludge treatment facilities are composed principally of a sludge tank 1 and a sedimentation basin 2, as illustrated in FIG. 2. The treatment of waste water using such type of activated sludge treatment facilities is performed as follows. First, waste water is introduced into the sludge vessel 1 and contacted with activated sludge under the supply of air to allow microbial oxidation to proceed. Then, effluent from the sludge tank 1 is fed to the sedimentation basin 2 to allow natural sedimentation to take place. Supernatant liquid in the sedimentation basin 2 is discharged as treated water through, for example, a chlorine sterilization basin, while activated sludge precipitated in the sedimentation basin 2 is returned to the sludge tank 1.

In actual facilities, pre-treatment is conducted in many cases using, for example, a sedimentation basin (a first sedimentation basin) provided before the sludge tank 1. Activated sludge in an amount corresponding to an increase in the sedimentation basin 2 is fed as excess sludge to a sludge disposal apparatus (not shown).

The above related activated sludge process is disadvantageous in that the natural sedimentation in the sedimentation basin 2 requires a considerable time and that a large capacity is required for the sedimentation basin 2. Further, when attention is paid to the sludge concentration (2,000-4,000 ppm) in the sludge tank 1, the higher the sludge concentration, the larger the treating capacity, but a considerable time is required for the natural sedimentation.

In order to eliminate the above-mentioned drawbacks it has been proposed to use a high polymer membrane such as an ultrafilter in place of the sedimentation basin 2. The use of an ultrafilter is advantageous in that a considerable time for the natural sedimentation is no longer required, nor is such a large capacity as the sedimentation basin 2 required.

In such high polymer membrane, however, care must be exercised in scratching off the deposited on the membrane surface and in washing. This is because breakage of the membrane would make its reuse impossible. Thus, ultrafilters and other high polymer membranes involve problems in point of durability.

SUMMARY OF THE INVENTION

It is the object of the present invention to provide an activated sludge treatment apparatus which does not require such a large capacity as a sedimentation basin and which can stand long use.

In the activated sludge treatment apparatus according to the present invention, effluent from a sludge tank is allowed to pass through a ceramic filter to separate activated sludge and treated water from each other.

According to such activated sludge treatment apparatus, unlike the conventional apparatus using a sedimentation basin, the time required for natural sedimentation is no longer required and a small capacity will do; besides, unlike high polymer membranes, such operations as scratching off deposit and washing are easy and permit reuse as many times as desired, and so the apparatus stands long use.

In short, the operating time can be shortened, capacity is reduced and durability is improved.

DESCRIPTION OF THE EMBODIMENT

Figure 1:
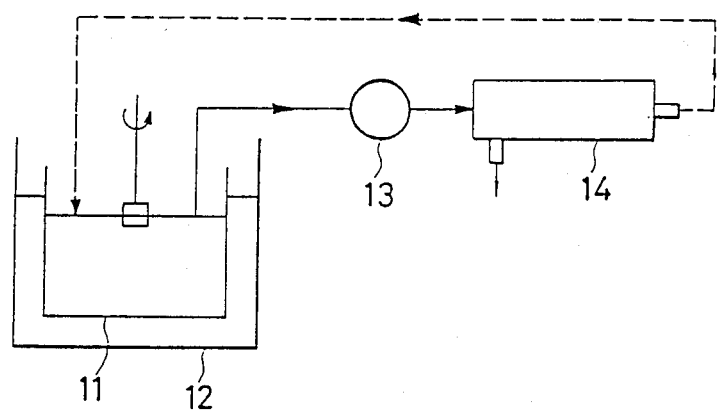
FIG. 1 is a block diagram of an activated sludge treatment apparatus according to an embodiment of the present invention.
Figure 2:
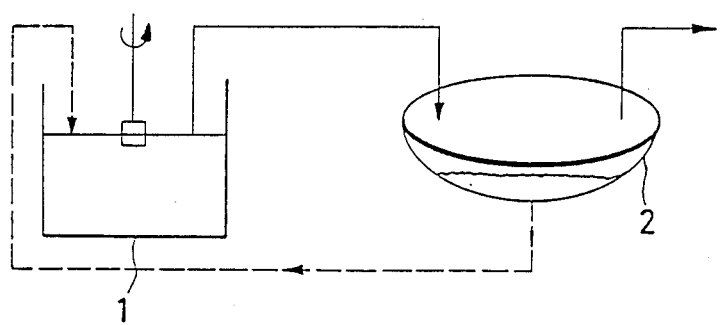
FIG. 2 is a block diagram showing a principal portion of conventional activated sludge treatment facilities.

In FIG. 1, liquid synthesis waste (hereinafter referred to as "waste water") which has been subjected to a pre-treatment for the removal of large-sized solids for example is introduced into a sludge tank 11 which is disposed within a constant temperature bath 12. In the sludge tank 11, the waste water is contacted with activated sludge under the supply of air to allow microbial oxidation to proceed. Then, effluent in the sludge tank 11 is fed to a ceramic filter 14 through a pump 13 to separate it into activated sludge and permeated water (treated water). The remaining activated sludge not permeated through the ceramic filter is returned to the sludge tank 11.

As the ceramic filter 14 there was used a filter (trade name: Cerabel Ceramic Filter, a product of Toshiba Ceramics Co.) formed of a high purity alumina and having a multi-layer structure which becomes larger in pore diameter gradually from an inner surface toward an outer surface.

It goes without saying that according to the above activated sludge treatment apparatus, the time required for natural sedimentation is no longer required and a small capacity will do, unlike conventional facilities using a sedimentation basin. Further, since there is used the ceramic filter 14 which is much higher in strength than high polymer membranes such as ultrafilters, it is easy to perform such operations as scratching off deposit and washing and the filter can be used again and again, so the apparatus can stand long use.

The following various experiments were conducted for the purpose of finding out optimum operating conditions in the use of such activated sludge treatment apparatus.

Figure 3:
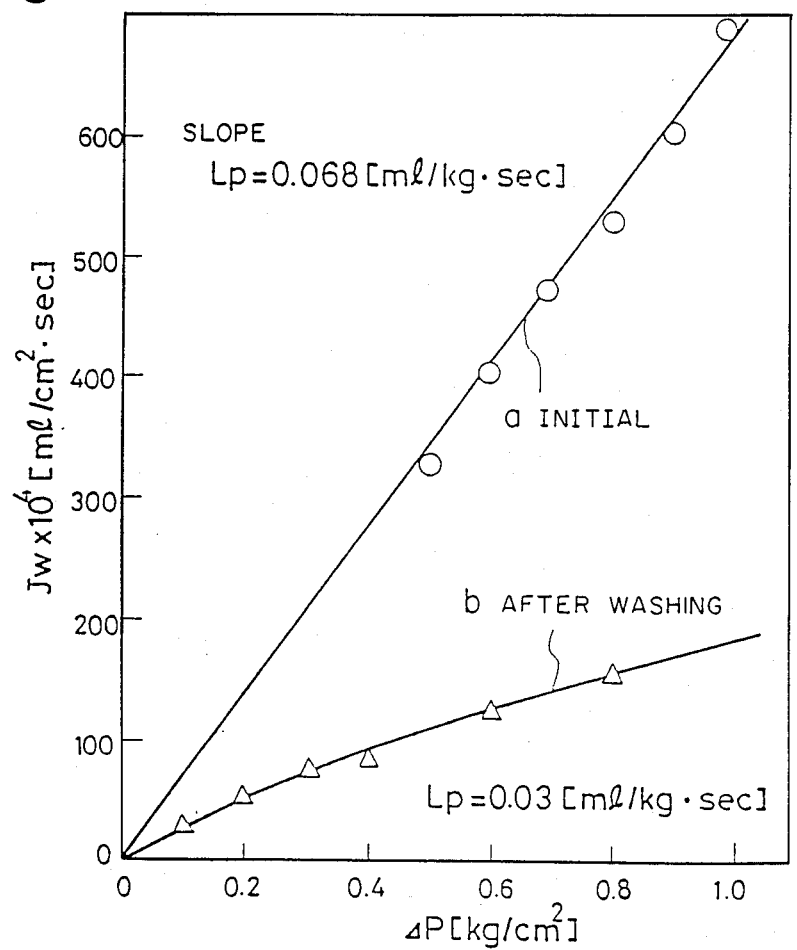
FIG. 3 is a characteristic diagram showing a relation between operating pressures in the use of the above activated sludge treatment apparatus and permeation flux of pure water.

Referring now to FIG. 3, there is shown a relation between operating pressures $\Delta P$ and permeation flux Jw in the case where pure water is passed through the ceramic filter 14 in the above activated sludge treatment apparatus. In FIG. 3, the mark "a" represents a permeation flux of pure water at an initial stage, and the mark "b" represents a permeation flux of pure water after use in an activated sludge treatment and washing. In the same figure, the reason why the permeation flux after washing does not recover up to the initial permeation flux is presumed to be because there remains activated sludge adhered to the ceramic filter 14. Washing was stopped when the permeation flux of pure water at low pressure recovered to about 45% of the initial permeation flux.

Figure 4:
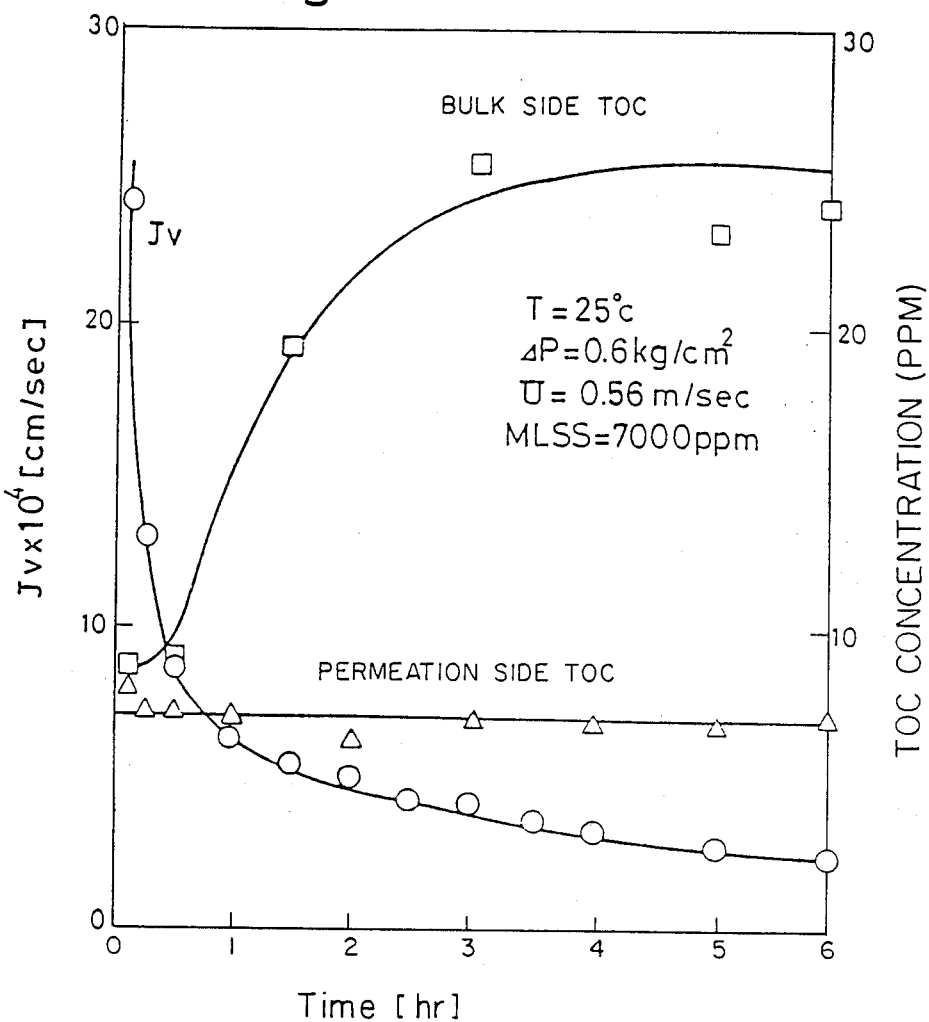
FIG. 4 is a characteristic diagram showing changes with time of permeation flux and TOC (total organic carbon) in an activated sludge treatment for waste water using the above activated sludge treatment apparatus.

Then, an activated sludge treatment was performed to check changes with time of a permeation flux Jv and TOC (total organic carbon) at an operating pressure $\Delta P = 0.6$ kg/cm$^2$. Results are as shown in FIG. 4, from which it is seen that a considerable time is required until the permeation flux reaches a steady state. Moreover, SVI (sludge volume index), which had been about 35 before the experiment, increased to about 110 after the experiment. This is presumed to be because sludge flocs have been broken by agitation in the pump 13. A permeation-side TOC is almost constant at 7 ppm regardless of a bulk-side TOC.

The operation was stopped after 6 hours as shown in FIG. 4 and the sludge adhered to the ceramic filter 14 was scratched off. The deposit was found to have an MLSS (mixed liquor suspended solid) of about 60,000 ppm.

Figure 5:
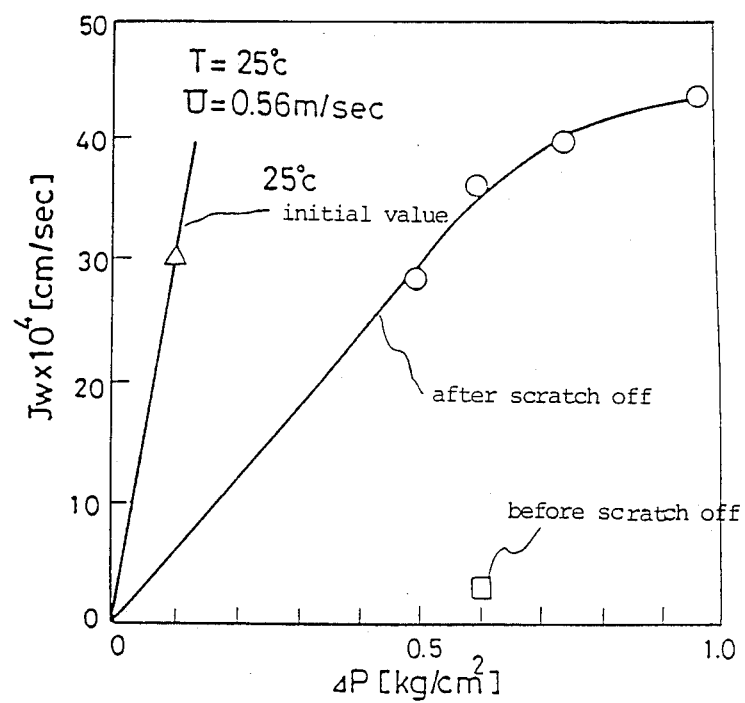
FIG. 5 is a characteristic diagram showing a relation between operating pressures and permeation flux of pure water.

FIG. 5 shows a relation between operating pressures $\Delta P$ and permeation flux Jw obtained by passing pure water through the filter after scratching off the deposit. Initial characteristic is also shown in FIG. 5. Comparison from the permeation flux of pure water at an initial stage in FIG. 5 shows that the ratio of resistance induced by plugging up of the filter to that induced by the filter deposit is approximately 1:17, among factors which cause reduction of the permeation flux.

Figure 6:
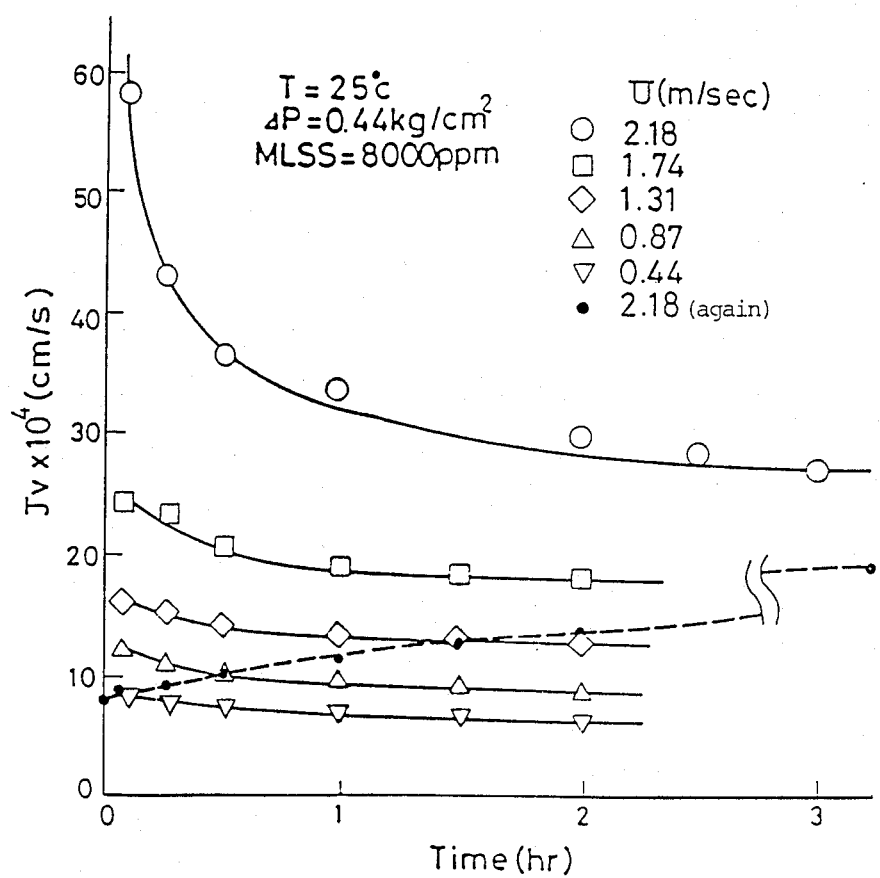
FIGS. 6 to 9 are each a characteristic diagram showing changes with time of permeation flux, with flow velocity as a parameter, in an activated sludge treatment for waste water conducted at different operating pressures using the above activated sludge treatment apparatus.
Figure 7:
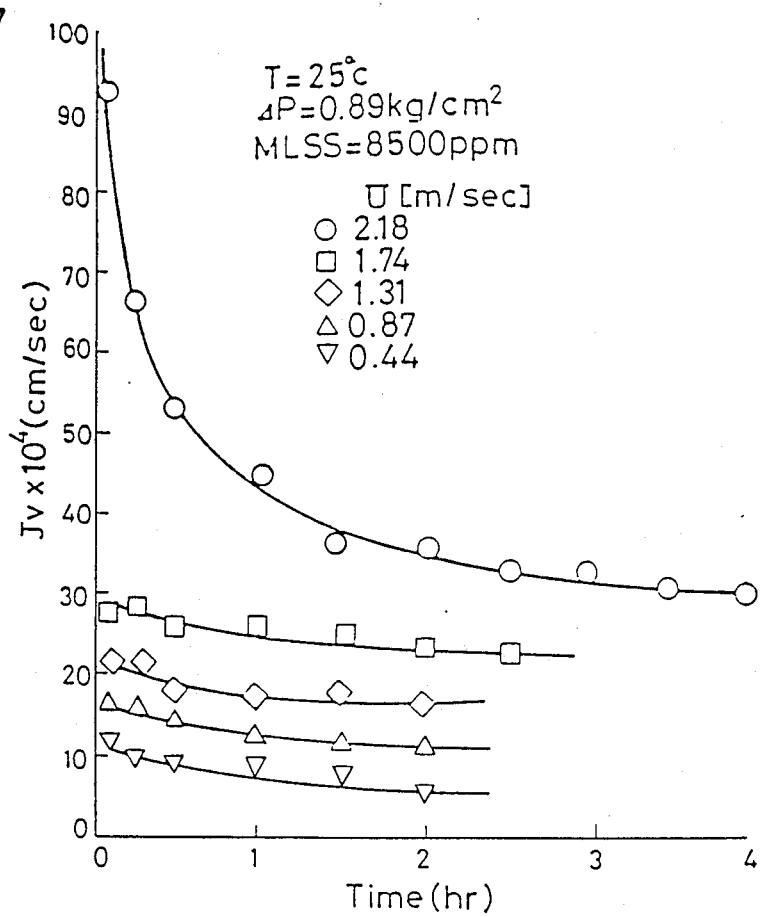
Figure 8:
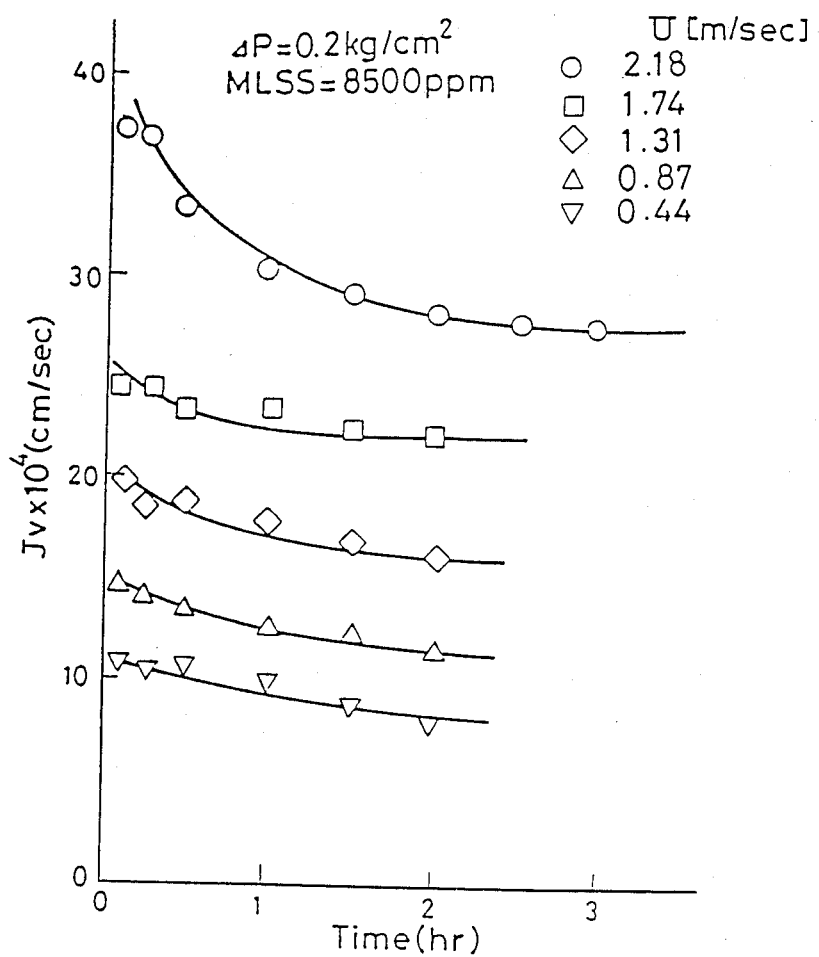
Figure 9:
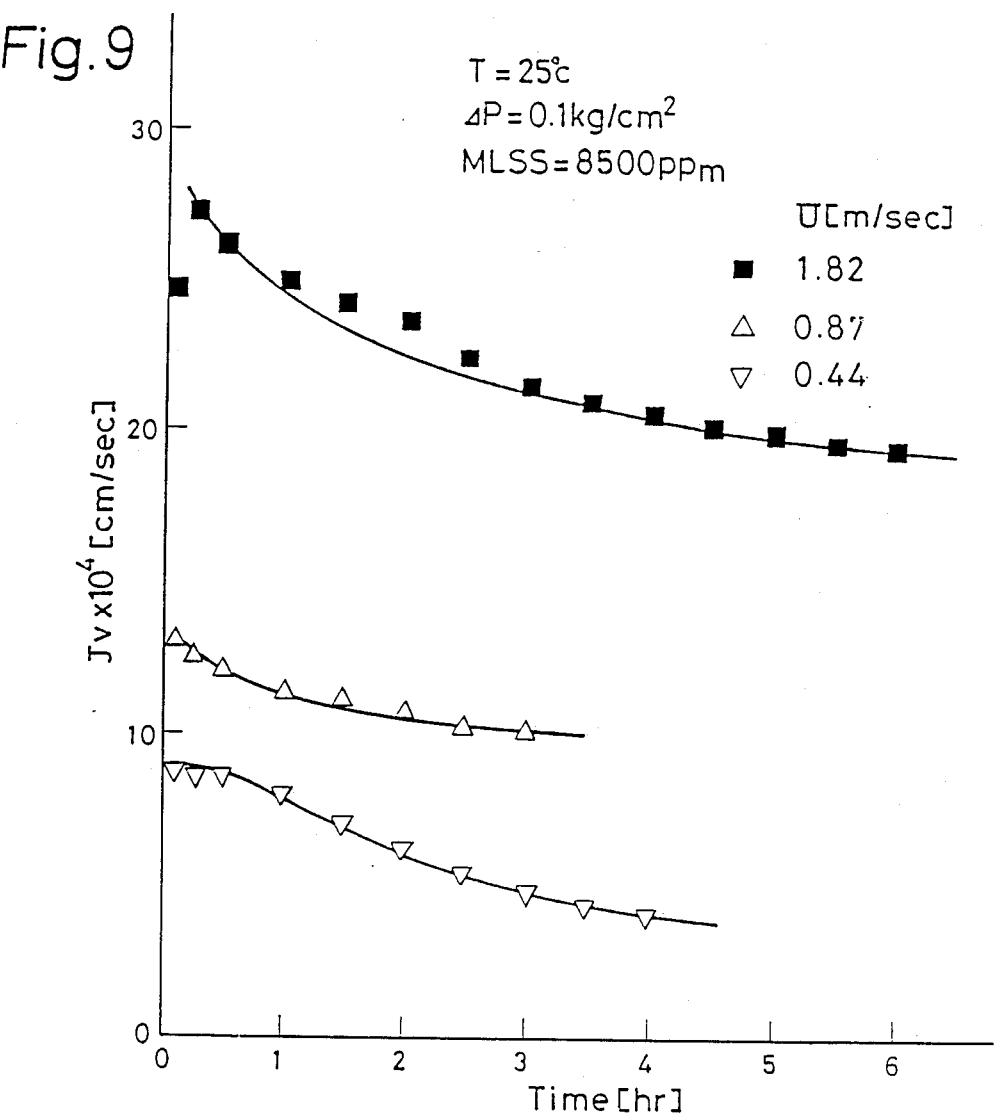

Referring now to FIGS. 6 to 9, there are shown changes with time of a permeation flux of waste water at various operating pressures, with flow velocity U of the waste water as a parameter. In each of these experiments, flow velocity was changed from high to low. In FIG. 6 there are also shown changes in permeation flux with time observed when an average flow velocity of waste water was once lowered to a minimum of 0.44 m/sec and then increased again up to 2.18 m/sec. In the same figure, a steady flux at the re-increased flow velocity of 2.18 m/sec is not in recovery up to the steady flux at the initial 2.18 m/sec. Also in the case where the flow velocity was changed from minimum again to maximum in the experiments shown in FIGS. 7 to 9, it was confirmed that there was no recovery in steady flux up to the steady flux at the initial maximum flow velocity.

Figure 10:
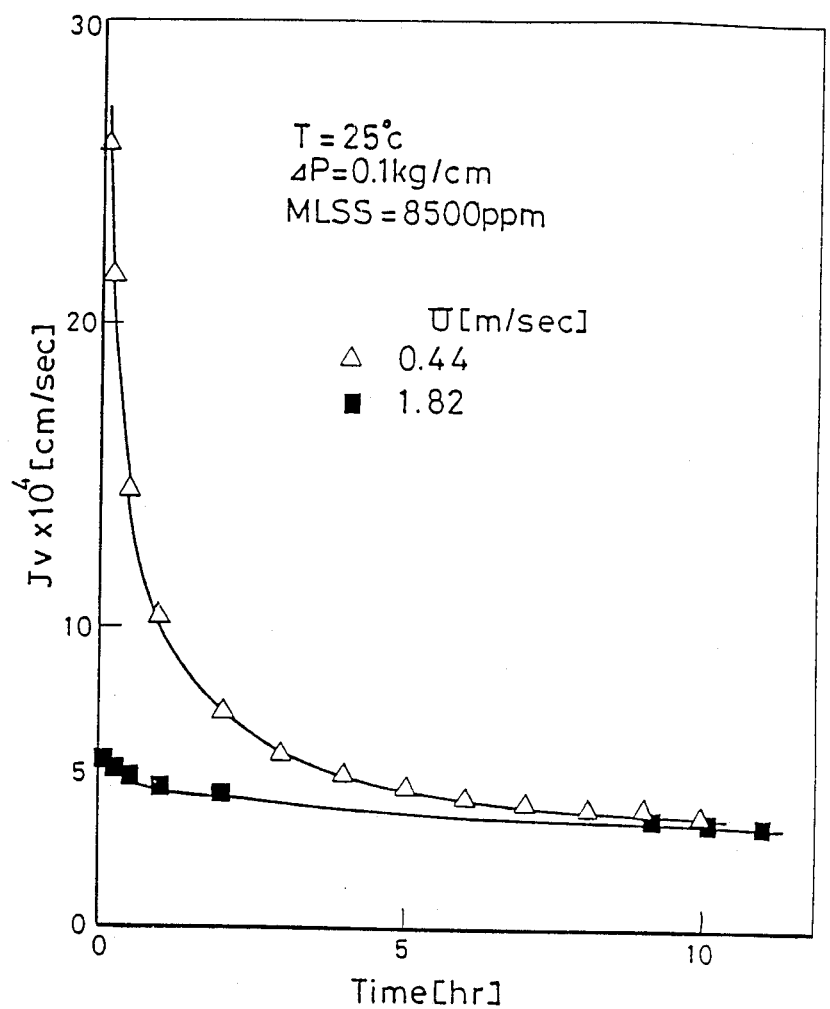
FIG. 10 is a characteristic diagram showing changes with time of permeation flux, with flow velocity as a parameter, in an activated sludge treatment for waste water conducted first at a low flow velocity and thereafter at an increased flow velocity.

In order to confirm the propriety of the above experimental method in which the flow velocity of waste water is changed gradually from high to low, a permeation flux was measured while the flow velocity of waste water was held low from the beginning. Results are as shown in FIG. 10. The operating pressure was set at 0.1 kg/cm$^2$ like FIG. 9. From FIG. 10 it is seen that the steady flux at the flow velocity of 0.44 m/sec is about the same as the steady flux ($4 \times 10^{-4}$ cm/sec) in FIG. 9 and that the above experimental method is proper When the flow velocity was increased to 1.82 m/sec after a steady flux had been obtained at the flow velocity of 0.44 m/sec, there was recognized no increase in flux. From this fact it is seen that once deposit is formed on the filter surface, the deposit is difficult to be stripped off even if the flow velocity is increased.

Figure 11:
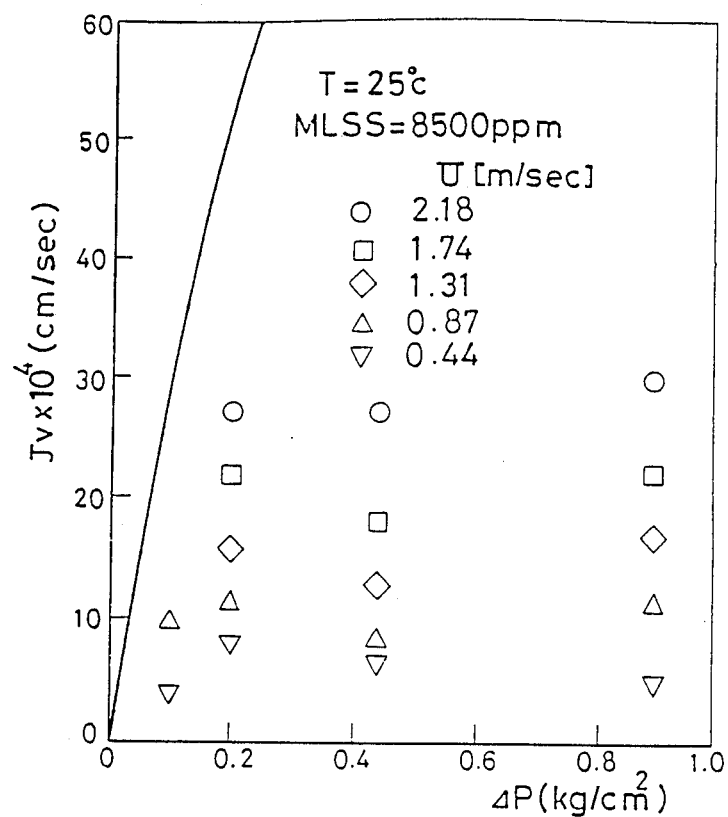
FIG. 11 is a diagram showing dependency of a steady flux upon operating pressures in an activated sludge treatment for waste water conducted using the above activated sludge treatment apparatus.

Further, the steady flux values obtained in the experiments of FIGS. 6 to 9 were plotted with respect to operating pressures to check how the steady fluxes depended on the operating pressures. Results are as shown in FIG. 11, in which the solid line indicates a permeation flux of pure water through the ceramic filter. From FIG. 11 it is seen that under the same flow velocity of waste water there is not much difference in steady flux between the operating pressures of 0.2 kg/cm$^2$ and 0.89 kg/cm$^2$ and that the application of a large pressure does not contribute at all to the increase of steady flux. It was also confirmed that in the use of an ultrafilter the treatment is performed usually at an operating pressure of 2 kg/cm$^2$ or so, while in using the ceramic filter, the treatment can be done at a very small operating pressure.

Figure 12:
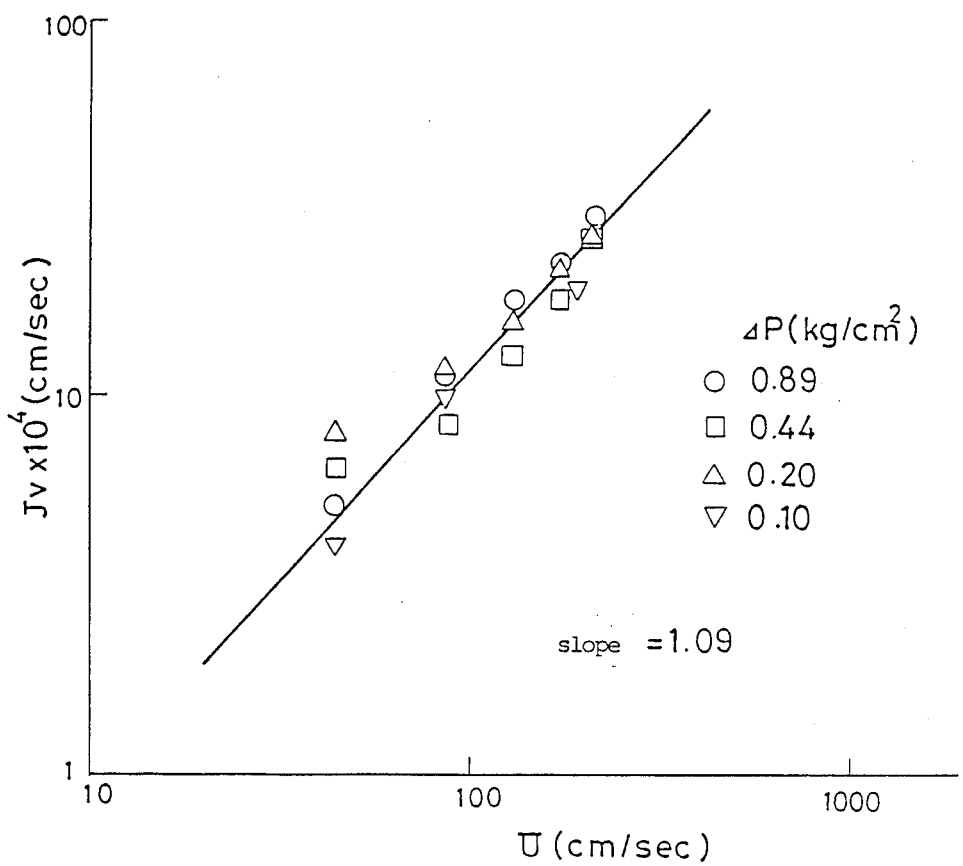
FIG. 12 is a characteristic diagram showing dependency of a steady flux upon flow velocity in an activated sludge treatment for waste water conducted using the above activated sludge treatment apparatus.

On the other hand, the dependency of steady flux upon flow velocity was checked. Results are as shown in FIG. 12. It is seen from FIG. 12 that the steady flux is a function of flow velocity. Calculated from the slope of the straight line in FIG. 12, the steady flux is proportional to the 1.1th power of the flow velocity. It is known that in the case of an ordinary solute, flux is proportional to the 0.8th power of flow velocity in a turbulent flow region. Thus, it is seen that the dependency of steady flux upon flow velocity is large in the case of waste water containing activated sludge.

Optimum conditions for a waste water treatment using the activated sludge treatment apparatus of the present invention can be set easily on the basis of the above experiments.

We claim:

1. An activated sludge treatment apparatus comprising:
    a bath;
    a sludge tank for containing waste water and for treating activated sludge, said tank being in thermal communication with said bath so as to maintain a substantially constant temperature within said tank;
    a ceramic filter for separating waste water into activated sludge and treated water, said filter having a multi-layer structure which becomes gradually larger in pore diameter from its inner surface toward its outer surface and having an inlet, a first outlet located at a side opposite said inlet, and a second outlet located at a side adjacent said inlet, wherein the waste water passes through the interior of the ceramic filter, the treated water is obtained at said second outlet and the activated sludge is obtained at said first outlet;
    a first passage connecting said tank to said inlet of said filter, so as to facilitate the passing of the waste water from said tank into said filter;

a second passage connecting said first outlet of said filter to said tank, so as to facilitate the passing of the activated sludge from said filter into said tank.

2. An apparatus according to claim 1, further comprising a pump disposed between said tank and said filter, so as to feed said waste water into said filter.

3. An activated sludge treatment apparatus according to claim 1, wherein said ceramic filter is formed of a high purity alumina.

* * * * *